J. H. SPANGLER.
COLLAPSIBLE BOX FOR SHIPMENT OF EGGS AND OTHER ARTICLES.
APPLICATION FILED APR. 19, 1920.
1,373,107.
Patented Mar. 29, 1921.
2 SHEETS—SHEET 1
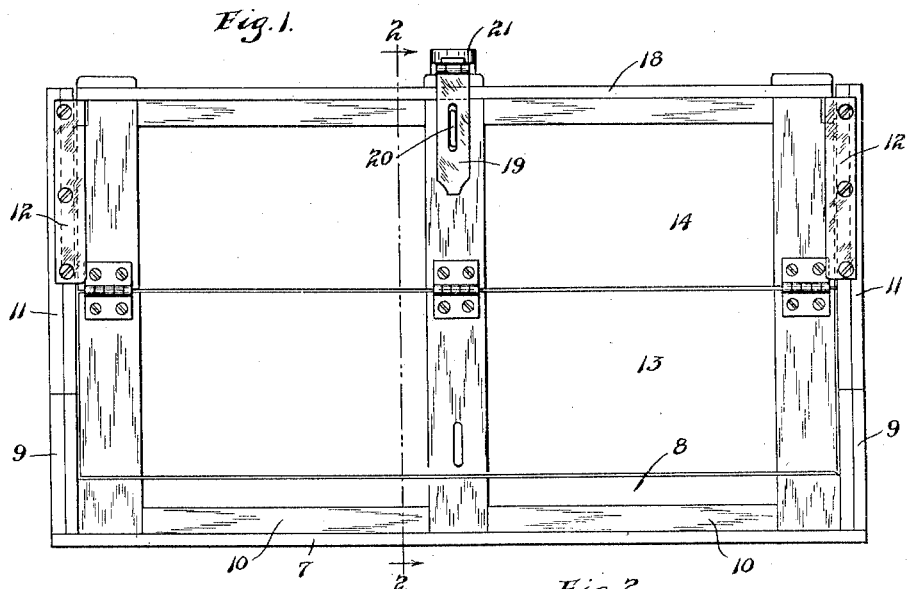
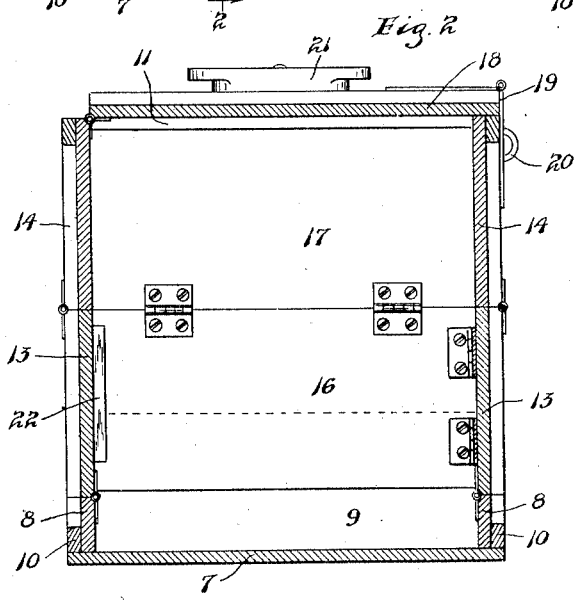
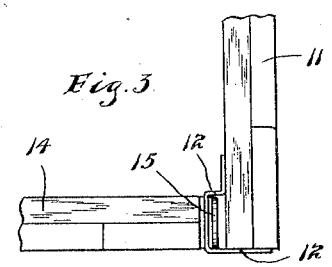
INVENTOR.
JOHN H. SPANGLER,
BY HIS ATTORNEYS J. H. SPANGLER.
COLLAPSIBLE BOX FOR SHIPMENT OF EGGS AND OTHER ARTICLES.
APPLICATION FILED APR. 19, 1920.
1,373,107.
Patented Mar. 29, 1921.
2 SHEETS—SHEET 2.
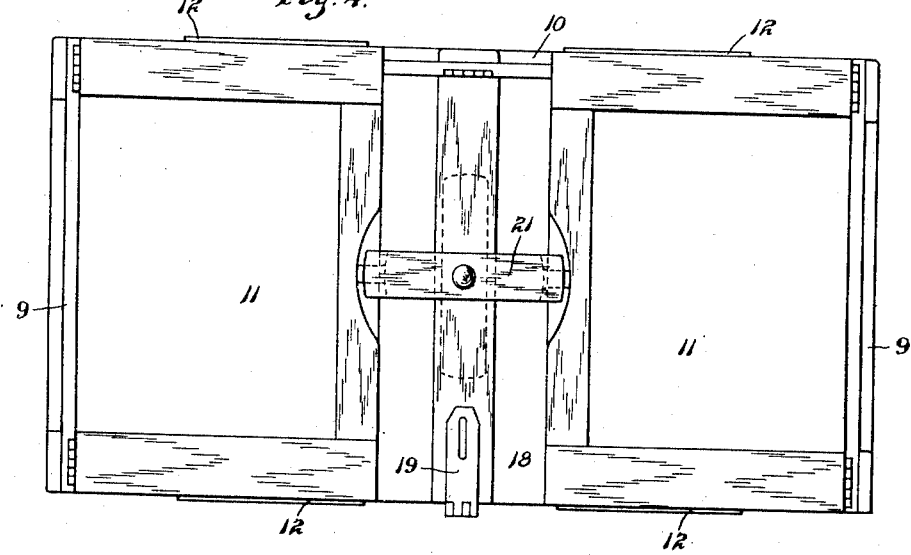
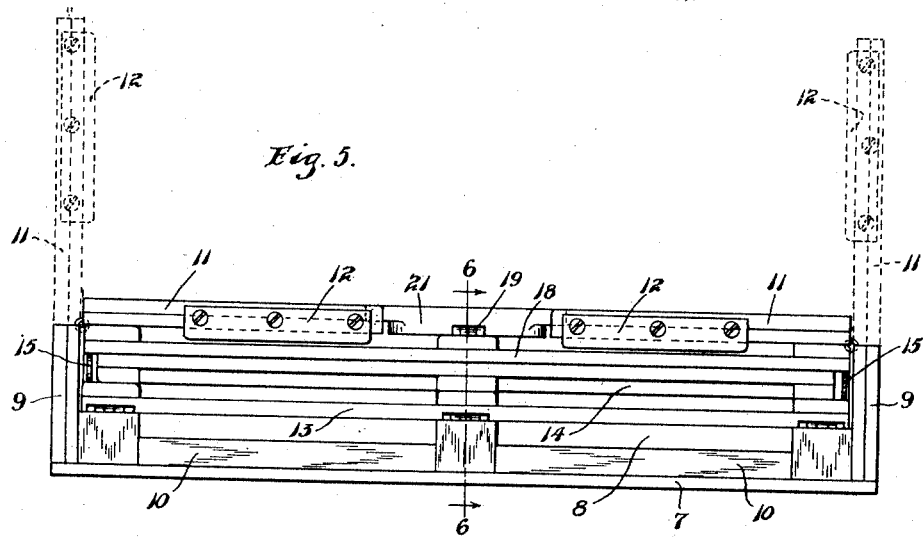
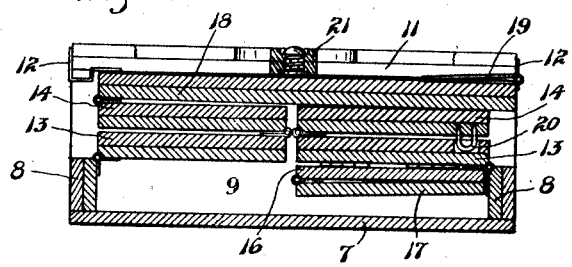
INVENTOR.
JOHN H. SPANGLER
BY HIS ATTORNEYS.

UNITED STATES PATENT OFFICE.

JOHN H. SPANGLER, OF MINNEAPOLIS, MINNESOTA, ASSIGNOR OF ONE-HALF TO GUSTAV TEGELER, OF ST. PAUL, MINNESOTA.

COLLAPSIBLE BOX FOR SHIPMENT OF EGGS AND OTHER ARTICLES.

1,373,107.     Specification of Letters Patent.     Patented Mar. 29, 1921.

Application filed April 19, 1920. Serial No. 374,936.

*To all whom it may concern:*

Be it known that I, JOHN H. SPANGLER, a citizen of the United States, residing at Minneapolis, in the county of Hennepin and State of Minnesota, have invented certain new and useful Improvements in Collapsible Boxes for Shipment of Eggs and Other Articles; and I do hereby declare the following to be a full, clear, and exact description of the invention, such as will enable others skilled in the art to which it appertains to make and use the same.

My invention has for its object to provide a collapsible box well adapted for the shipment of eggs or other materials, when the parts are in box-like form, and which, when the parts are in their collapsed positions, occupies comparatively little space, so that, on the return shipment, it can be treated practically like solid lumber, thereby effecting a great saving in the cost of transportation, and of space, when idle and in storage.

To this end, the invention consists of the novel devices and combinations of devices hereinafter described and pointed out in the claims.

My invention, in its preferred form, is illustrated in the accompanying drawings, wherein like notations refer to like parts throughout the several views.

Referring to said drawings:—

Figure 1 is a view showing the box in side elevation;

Fig. 2 is a vertical cross section on the line 2—2 of Fig. 1;

Fig. 3 is a detail in plan showing the interlocking connections between the end and the side walls;

Fig. 4 is a plan view of the box with the parts collapsed and fastened down; but with the pivoted part of the pad-lock hasp turned up over the top;

Fig. 5 is a side elevation showing in full lines the parts shown in Fig. 4, to wit: in their collapsed positions, but showing in dotted lines the positions taken by the hinged sections of the end walls, when upright; and Fig. 6 is a vertical cross section of the collapsed box on the line 6—6 of Fig. 5.

The numeral 7 represents the base board, the numerals 8 a pair of shallow side wall sections fixed to the base board 7, and the numeral 9 a pair of fixed end wall sections fixed to the base board 7 and the fixed side wall sections 8; and the numerals 10 represent reinforcing pieces secured to the said base board and fixed wall sections, where needed for purposes of strength.

The said parts 7, 8 and 9, with the reinforcing pieces 10, coöperate to afford a shallow box-like base with fixed walls or wall sections, and of these, the fixed end wall sections 9 are of a height considerably greater than the fixed side wall sections 8, as best shown in Figs. 1 and 5.

The numeral 11 represents end wall sections hinged to the fixed end wall sections 9 and provided, on their upper inner corners, with metallic keepers 12. The numerals 13 and 14 represent, respectively, the lower and upper sections of the folding side walls, which two sections 13 and 14 are hinged together and which lower sections 13 are hinged, one to each of the shallow fixed side walls 8, as best shown in Fig. 2. The upper sections 14 of the folding side walls are provided, at their inner upper corners, with projecting metallic tongues 15 adapted to engage with the keepers 12 on the folding end wall sections 11, when the parts are in their upright position, and thereby interlock the end and side walls together. The numerals 16 and 17 represent a folding partition, the two sections of which are hinged together and the lower of which, to wit: section 16, is hinged to the lower section 13 of the front folding wall. The numeral 18 represents a top hinged to the upper section 14 of the folding back wall of the box, and this is shown as provided with an ordinary padlock hasp 19 at its forward edge, the slotted pivoted section of which is adapted to engage with a staple 20 fixed to the upper section 14 of the front folding wall of the box, as shown in Figs. 1 and 2.

The numeral 21 represents a spring-seated turnbutton, best shown in Figs. 2, 4 and 6, which, when the parts are collapsed, is adapted to take the position shown in Fig. 4, for holding the parts together in their collapsed position. 22 represents a stop for the partition.

With this construction, when the parts are in the positions shown in Figs. 1, 2 and 3, the folding end and side walls will be interlocked together by the interconnection and coöperation of the keepers 12 on the end walls and the tongues 15 on the upper sections of the folding side walls, and, when the folding partition, made up of the parts 16 and 17, is in the position shown in Fig. 2, it will brace apart the central portions of the side walls, while serving, at the same time, to divide the box into two equal sized compartments, adapted to be loaded with eggs in ordinary carriers made out of interlocked strips of cardboard, which, when in collapsed position, occupy but little space. The top can be then closed and a padlock applied and the box of eggs is ready for shipment.

Then, when the eggs are removed, the egg carriers may be collapsed and laid down in the bottom of the box, and, if properly distributed, will not fill the same to a height any greater than the fixed end wall sections 9.

Then, the partition can be folded sidewise against the front folding wall of the box and then its upper section turned downward on its lower section, so that both thereof will lie flush with the inner face of the lower section of said front folding wall. Then, the front wall can be buckled inward on the hinges connecting its two sections 13 and 14 and, in this buckling action, the tongues 15 will be withdrawn from the keepers 12 of the end section, and, when the buckling action is completed, the upper section 14 will overlie the lower section 13, and the folded partition will underlie the inner face of the bottom section 13, as best shown in Fig. 6. Then, the top is raised and, by a similar buckling action, of the folding back wall, the tongues 15 of its upper section will be withdrawn from the keepers 12 of the folded end walls, and the two sections folded together, with the upper over the lower, and the top can then be turned down, so as to overlie the two folded side walls, and then the folding end sections can be turned inward over the said top and the box will be in its collapsed position. Then, the spring-seated turnbutton carried by the top can be turned into the position shown in Fig. 4, and thereby be made to engage the edges of the inturned end walls, and thus fasten all of the collapsed parts securely together into a compact mass, occupying comparatively little space, and which can be shipped and otherwise handled practically like solid lumber.

It must be understood that the details of the construction can be varied to a considerable extent within the scope of my invention from the broad point of view; and hence, I desire the broadest possible protection for the same, as pointed out in the broadest of the claims, hereinafter made, as well as on the specific construction illustrated and pointed out in some of the more specific claims hereinafter noted.

It will also be understood, of course, that, while this collapsible box is especially well adapted for shipping eggs, it is capable of use for shipping or handling many other kinds of articles or materials.

What I claim is:—

1. A collapsible shipping box comprising a base, sectional end walls, the lower sections of which are fixed to the base and the upper sections of which are hinged to the fixed sections, sectional side walls having their sections hinged together and the lower sections thereof hinged to the base and adapted to fold first together and then downward and inward into a common plane within the fixed sections of the end walls, a top section hinged to the upper section of one of the side walls and adapted to fold over the folded side walls and permit the hinged sections of the end walls to be folded inward over the same, and a fastening device applied to said top section and engageable with the upper free edge portions of said two hinged sections of the end walls to lock the same in folded relation.

2. A collapsible shipping box comprising a base, sectional end walls, the lower sections of which are fixed to the base and the upper sections of which are hinged to the fixed sections, sectional side walls having their sections hinged together and the lower sections thereof hinged to the base and adapted to fold first together and then downward and inward into a common plane within the fixed sections of the end walls, a top section hinged to the upper section of one of the side walls and adapted to fold over the folded side walls and permit the hinged sections of the end walls to be folded inward over the same, and a spring-seated turnbutton carried by said top and adapted to be engaged with said infolded end sections to hold all of the folded parts in their folded positions, substantially as described.

3. A collapsible shipping box comprising a base, sectional end walls, the lower sections of which are fixed to the base and the upper sections of which are hinged to the fixed sections, sectional side walls having their sections hinged together and the lower sections thereof hinged to the base and adapted to fold first together and then downward and inward into a common plane within the fixed sections of the end walls, a top section hinged to the upper section of one of the side walls and adapted to fold over the folded side walls and permit the hinged sections of the end walls to be folded inward over the same, keeper lugs at the inner upper corners of the folding sections of the side walls, and projecting tongues at the upper corners of the upper sections of the folding side walls adapted to engage with said keepers to interlock together the end and side walls when in their upright positions, substantially as described.

4. A collapsible shipping box comprising a base, sectional end walls, the lower sections of which are fixed to the base and the upper sections of which are hinged to the fixed sections, sectional side walls having their sections hinged together and their lower sections hinged to the base and adapted to fold first together and then downward and inward into a common plane within the fixed sections of the end walls, a vertical partition composed of two sections horizontally hinged together and the lower section of which is vertically hinged to the lower section of one of the side walls, the sections of which partition are adapted to fold together and to fold against said side wall, and a top section hinged to the upper section of one of the side walls and adapted to fold over the folded side walls and permit the hinged sections of the end walls to be folded inward over the same, substantially as described.

In testimony whereof I affix my signature.

JOHN H. SPANGLER.